(12) United States Patent  
Murphy et al.

(10) Patent No.: US 11,401,680 B2  
(45) Date of Patent: *Aug. 2, 2022

(54) SYSTEM AND METHOD FOR MONITORING A FIBER AND A DETECTOR ATTACHED TO THE FIBER

(71) Applicant: Network Integrity Systems, Inc., Hickory, NC (US)

(72) Inventors: Cary R. Murphy, Hickory, NC (US); Mark K. Bridges, Hickory, NC (US); Joseph Giovannini, Hickory, NC (US)

(73) Assignee: NETWORK INTEGRITY SYSTEMS, INC., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,703

(22) Filed: Jan. 29, 2021

(65) Prior Publication Data

US 2021/0156106 A1  May 27, 2021

Related U.S. Application Data

(63) Continuation of application No. 15/449,880, filed on Mar. 3, 2017, now Pat. No. 10,914,047.

(51) Int. Cl.
| | |
|---|---|
| *E02D 29/12* | (2006.01) |
| *G01D 5/353* | (2006.01) |
| *G08B 29/06* | (2006.01) |
| *G08B 13/186* | (2006.01) |

(52) U.S. Cl.  
CPC ......... *E02D 29/12* (2013.01); *G01D 5/35316* (2013.01); *G08B 13/186* (2013.01); *G08B 29/06* (2013.01); *G01D 5/3539* (2013.01); *G01D 5/35396* (2013.01)

(58) Field of Classification Search  
CPC ...... E02D 29/12; G08B 13/186; G08B 29/06; G01D 5/35316; G01D 5/35396; G01D 5/3539  
See application file for complete search history.

(56) References Cited

U.S. PATENT DOCUMENTS

| | | | |
|---|---|---|---|
| 5,493,113 A | 2/1996 | Dunphy et al. | |
| 6,052,179 A | 4/2000 | Prohaska et al. | |
| 7,068,868 B1 | 6/2006 | Pi et al. | |
| 10,914,047 B2 * | 2/2021 | Murphy | ................ G08B 29/06 |

(Continued)

*Primary Examiner* — Jennifer D Bennett  
(74) *Attorney, Agent, or Firm* — Gordon Rees Scully Mansukhani, LLP

(57) ABSTRACT

A system for detecting an intrusion of at least one of a monitoring fiber and a detector comprises a sensor having a closure monitor and an intrusion monitor, the closure monitor including a signal generator and at least one detector attached to the monitoring fiber. The signal generator transmits signal light such that the monitoring fiber receives the transmitted signal light and reflects a portion of the signal light via the at least one detector to the closure monitor and transmits a non-reflected portion of the signal light. The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber and the at least one detector.

6 Claims, 8 Drawing Sheets

(56) References Cited

U.S. PATENT DOCUMENTS

2004/0240769 A1  12/2004  Spirin et al.
2005/0077455 A1  4/2005   Townley-Smith et al.
2006/0153491 A1  7/2006   Murphy et al.

* cited by examiner

SYSTEM AND METHOD FOR MONITORING A FIBER AND A DETECTOR ATTACHED TO THE FIBER

CROSS-REFERENCE TO RELATED PATENTS AND PATENT APPLICATIONS

This application relates to a system for detecting an intrusion of at least one of a monitoring fiber and at least one detector (e.g. a fiber optic manhole) attached to the monitoring fiber. Specifically, the application relates to monitoring a non-reflected portion of signal light to detect transient changes in the non-reflected portion of the signal light indicative of at least one of a vibration, a motion and a handling of at least one of the monitoring fiber and the at least one detector.

The application incorporates by reference the contents of each of U.S. Pat. Nos. 7,092,586; 7,120,324; 7,142,737; 7,206,469; 7,333,681; 7,403,674; 7,403,675; 7,634,387; 7,693,359; 7,706,641; 8,094,977; 8,233,755; and 9,046,669 and patent application Ser. Nos. 14/144,882; 14/145,121; and 14/457,818 which describe fiber optic detection apparatuses, systems and methods pertaining to monitoring an optical fiber and an optical fiber communication network that may be employed in the embodiments disclosed herein.

BACKGROUND

Modernly, data cables are run underground cities, campuses, and other locations with a point of access to the data cables being realized through a plurality of manholes having respective covers. Federal regulations may require the manhole covers to be locked or welded shut and/or to be protected by an alarm to detect a physical displacement or opening of the manhole. As threats of industrial espionage and domestic terrorism loom, non-federal entities are developing an enhanced posture towards data protection at the physical manhole cover layer.

Similarly, data networks within buildings also have protected points of entry such as doors to lock boxes. Protection mechanisms for manholes are adaptable for the barriers or enclosures for data networks in discreet facilities (e.g., buildings, warehouses, etc.).

Existing manhole protection systems may use detectors that include, for example, Fiber Bragg Gratings (FBG) such as those manufactured by Cleveland Electric Laboratories and CyberSecure IPS or fiber optic macrobend based detectors such as those manufactured by Woven Electronics, to detect the opening of a door or lid such as a manhole cover or network enclosure.

A system for detecting the physical displacement or opening of a manhole cover (i.e. a closure for a secure space or a network enclosure) is referred to herein as a "manhole" system. However, it should be recognized that the "manhole" system embodiments described herein may also be implemented as systems to detect the opening of doors in protective boxes for network installations, such as the user boxes in a Protective Distribution System.

These manhole systems afford protection for what is encased by these doors or covers by alarming when the sensor is actuated. Typically, the protection is for safeguarding data infrastructure such as network cables by detection of a potential intruder gaining access to an area of vulnerability.

A secondary level of protection, also described herein, for those data cables or other infrastructure may be implemented by further protecting and/or monitoring the cables or conveyance(s) against a physical intrusion such as tapping the cable for data theft or denial of service attacks by detection of mechanical perturbations that exist as a prelude to access.

These systems (and methods) that monitor and protect data cables against a physical intrusion may be referred to as alarmed carrier systems. As described herein, systems and methods may be implemented that integrate the manhole systems and the alarmed carrier systems together. This protection can be in the form of a sensor that detects handling and vibration of the cable or conveyance, such as by the INTERCEPTOR™ and VANGUARD™ products manufactured by Network Integrity Systems. These systems detect access to the cables carrying data, supplementing the physical security afforded by the door and manhole sensors.

A current manhole system assumes that any attempted breach into a data cable and/or network will be at a manhole or other sensor point, and will be detected by the sensor. However, if the breach occurs at a location anywhere other than at a specific sensor, the breach will not be detected. A secondary sensor system is a failsafe against an intrusion that is able to defeat (e.g., disable, avoid or bypass) a manhole or door sensor. If a manhole sensor is bypassed, the cable may still be protected because intrusion can be detected by a cable sensor.

The primary function of a manhole protection system is to prevent an attack on the cable located below the manhole (e.g., in the lock box), this primary function of the system may still be achieved by a cable sensor even if the manhole sensor is defeated. This secondary type of protection is particularly valuable in tunnel situations where an attacker might gain access to data cables by digging or tunneling to avoid detection by the door/manhole alarms.

Additionally, the sensors used for door/manhole alarms employ sensor fibers that are typically separate from the data fibers, because these sensors are installed inline on a fiber at each door/manhole location. The door/manhole sensor system is often an addition to an existing installation, and the sensor fiber may be attached to the doors and manholes. In all of these cases, an additional simple sensing fiber might be added to provide secondary protection.

In typical installations the data cable is of continuous length, and would not need to be intentionally breached to allow connection to the door/manhole alarm. Rather, the data would reside in cable(s) adjacent to but separate from the door/manhole alarm fiber.

Additionally, this secondary protection protects the manhole sensor fiber itself; if someone digs up and enters a cable and finds a way to cut or obscure the manhole sensor cable, all of the manhole sensors from that point on will be blind. Use of an Interceptor/Vanguard type sensor will allow detection of cable tampering before the cable cut and the manhole sensors defeated.

In addition to protecting the sensor and data cables, this secondary sensor system protects the conveyance which houses the data cables. A would be intruder can be detected upon a breach of any conveyance (i.e., carrier, conduit, duct, housing, etc.) prior to accessing the data fibers internal to the cables.

In some embodiments, there are several possibilities for the light transmitted into the manhole fiber by the manhole monitoring system to be used by the secondary monitoring system, which must be configured to accommodate this. In some embodiments, the direction of light travel is arbitrary, and functionality is identical if the direction of light is reversed.

SUMMARY

According to an embodiment, a system for detecting an intrusion of at least one of a monitoring fiber 30 and a detector 20 comprises a sensor 10 having a closure monitor and an intrusion monitor, the closure monitor including a signal generator; the monitoring fiber having a first end and a second end; and at least one detector 20 attached to the monitoring fiber. The signal generator generates and transmits signal light and the monitoring fiber receives the transmitted signal light via the first end of the monitoring fiber and reflects a portion of the signal light via the at least one detector 20 to the closure monitor. Further, the monitoring fiber 30 transmits a non-reflected portion of the signal light via the second end of the monitoring fiber 30. The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber 30 and the at least one detector 20.

The object and advantages of embodiments described herein will be realized and attained by means of the elements and combinations particularly pointed out in the claims.

It is to be understood that both the foregoing general description and the following detailed description are exemplary and explanatory and are not restrictive of the embodiments as claimed.

DETAILED DESCRIPTION

A "Manhole Monitor System" is the system described above, which uses as few as a single fiber for the monitoring of opto-mechanical switches on manhole covers and enclosure doors. When the cover is lifted or the door is opened, a physical displacement causes a change in characteristics of the monitor light (i.e., monitor signal) within the fiber. This allows a head end device to detect the opening of the protected device, and for some systems, discernment as to which sensor was activated (e.g. a specific manhole or specific user box within a particular room).

As referred to herein, "Extrinsic Monitoring" is the protection of a data carrying cable, group of cables, or conveyance by monitoring one or more sensor fibers placed in close proximity to, or within the conveyance, being protected. This method of extrinsic monitoring came into use by manufacturers of fiber optic sensors, typically perimeter security systems, which were placed into the conduits and duct banks of existing networks. Extrinsic monitoring systems are in compliance to the federal regulation for an Alarmed Carrier Protective Distribution System. Extrinsic monitoring systems typically use vibration or motion as a characteristic of the signal light being monitored.

As referred to herein, "Intrinsic Monitoring" is the protection of a data carrying cable by monitoring one or more fibers within that cable. Typically this is done by injecting a monitor signal into one or more unused fibers while monitoring exiting signal(s) for indications of disturbances. Intrinsic monitoring is similar to extrinsic monitoring except that, in intrinsic monitoring, the actual cable being protected is alarmed, and the closer one gets to the fibers, the more sensitive the system becomes.

Figure 12:
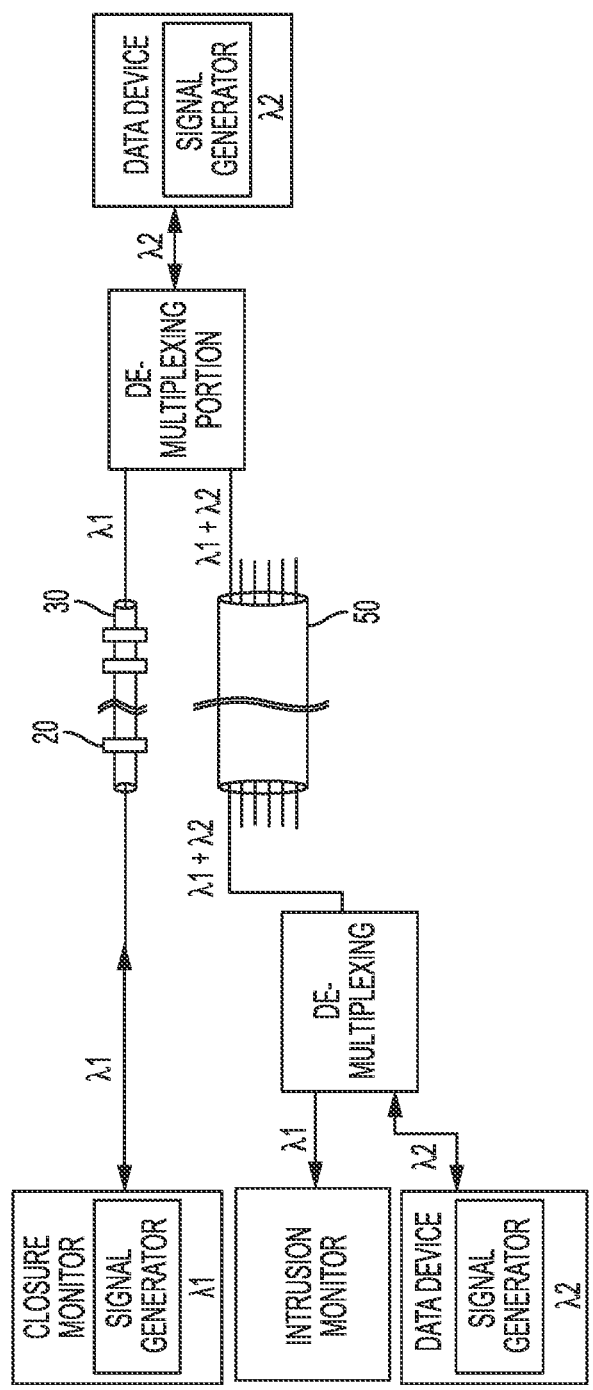
FIG. 12 illustrates signal light being transmitted to a monitoring fiber 30 such that a portion of the signal light is reflected to a closure monitor by at least one detector 20 attached to the monitoring fiber and a non-reflected portion of the signal light is transmitted to an intrusion monitor on a data carrying or active fiber of a data cable 50 to provide for intrinsic monitoring of the data cable 50.
Figure 13:
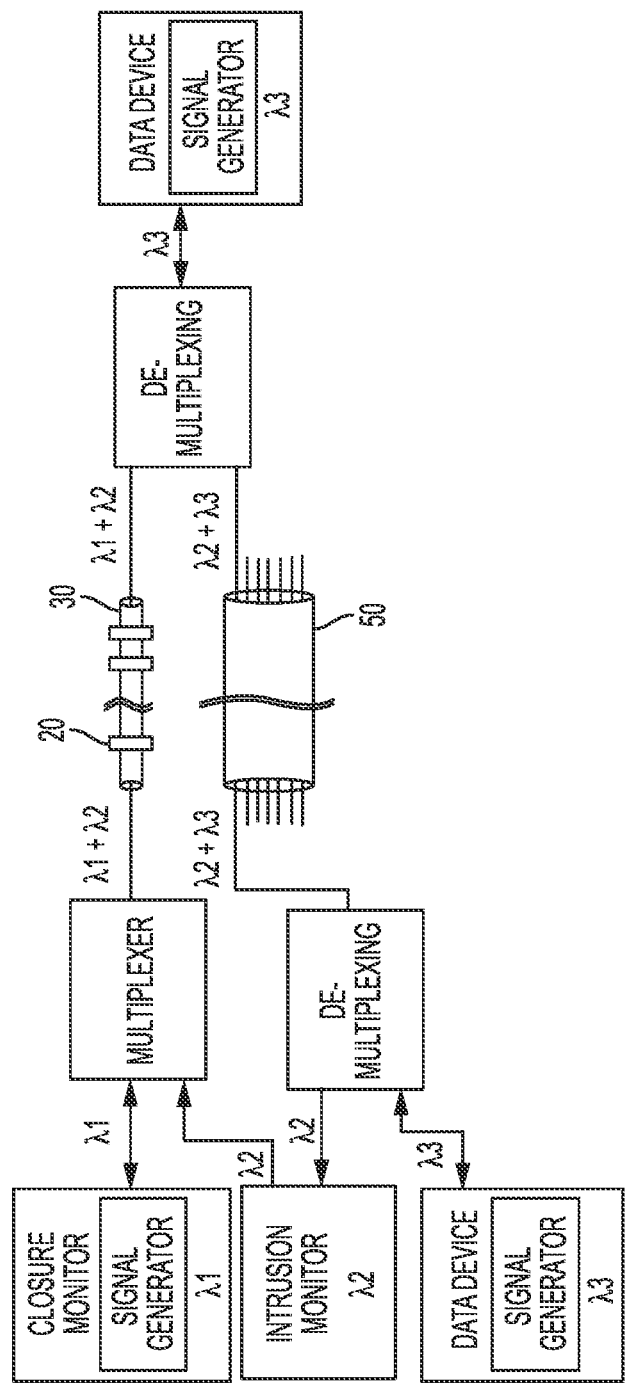
FIG. 13 illustrates signals from two light transmitters being multiplexed, the multiplexed signals being transmitted to the monitoring fiber 30 and a portion of the multiplexed signal light being returned to a closure monitor by at least one detector 20 attached to the monitoring fiber and a non-reflected portion of the signal light is transmitted to an intrusion monitor on a data carrying or active fiber of a data cable 50 to provide for intrinsic monitoring of the data cable 50.

Another form of Intrinsic monitoring involves alarming "active" fibers, that is, fibers currently in use such as for carrying data. Active fibers can be monitored by, at one end of the fiber, multiplexing a separate, different monitor light or monitor signal with the data signal(s), and de-multiplexing that monitor signal at the other end, joining and separating the two. FIG. 12 illustrates an exemplary embodiment of a system for monitoring active fibers in a condition where the manhole system signal is compatible with the secondary monitoring system and is being used as the monitor signal for both systems. FIG. 13 illustrates an exemplary embodiment of a system that monitors an active fiber intrinsically and the manhole signal is not suitable for use with the secondary monitor. Thus, the system shown in FIG. 13 includes two monitor signals—one for the manhole system and one for the secondary system.

Figure 5:
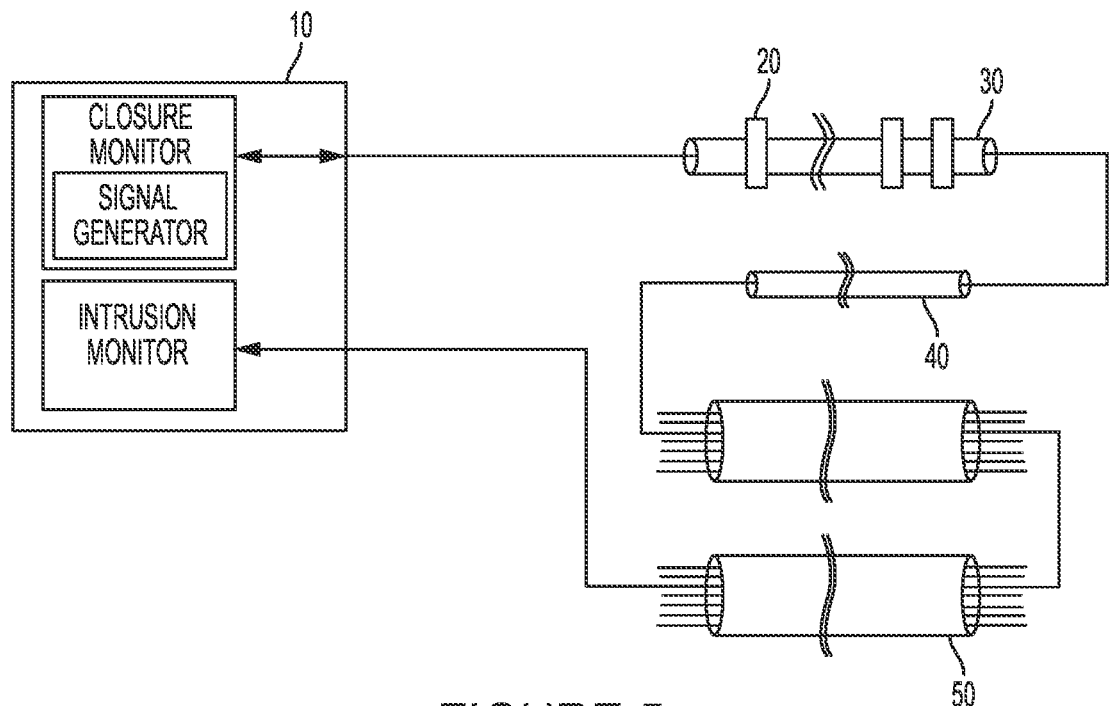
FIG. 5 illustrates the signal light being transmitted to the monitoring fiber 30 and a portion of the signal light being returned extrinsically by the at least one sensor fiber 40 and by at least one unused fiber of a plurality of cables 50.

Other systems may use a combination Intrinsic/Extrinsic monitoring. These systems use a combination of both types of monitoring where the monitor signal(s) is(are) routed through both one or more fibers internal to a cable, as well as one or more fibers external to the cable. This combination allows both sensitive cable monitoring as well as the added security of monitoring the conveyance for the fibers. An exemplary embodiment of a system employing a combination of intrinsic and extrinsic monitoring is shown in FIG. 5.

Various exemplary embodiments of the system and method for monitoring a fiber and at least one detector attached to the fiber are described below.

Figure 1:
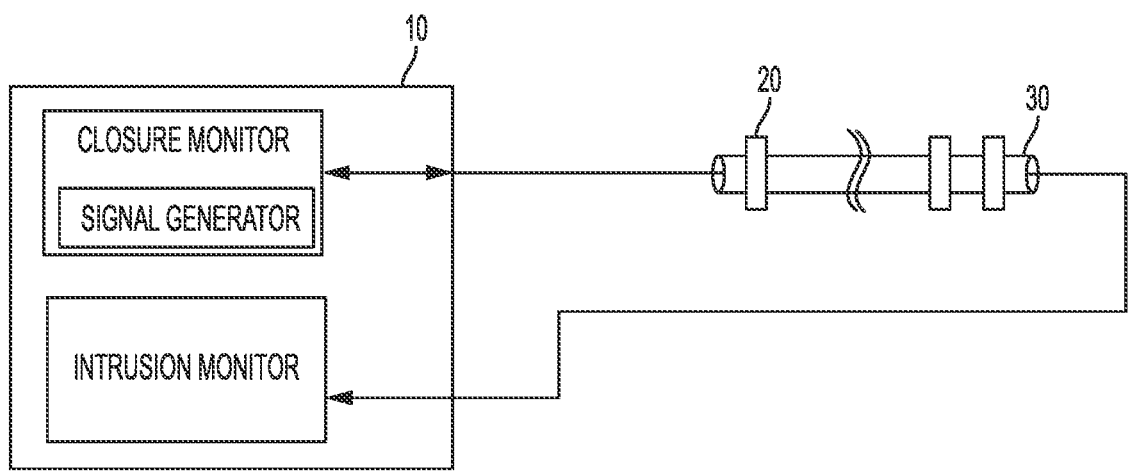
FIG. 1 illustrates signal light being transmitted to a monitoring fiber 30 such that a portion of the signal light is reflected to a closure monitor by at least one detector 20 attached to the monitoring fiber 30 and a non-reflected portion of the signal light is transmitted to an intrusion monitor.

According to an exemplary embodiment shown in FIG. 1, a system for detecting an intrusion of at least one of a monitoring fiber 30 and a detector 20 comprises a sensor 10 having a closure monitor and an intrusion monitor, a monitoring fiber 30 having a first end and a second end and at least one detector 20 attached to the monitoring fiber.

The closure monitor includes a signal generator that generates and transmits signal light. The signal generator may be one of a laser, a light emitting diode or other broadband light source and a variable wavelength source (e.g., a swept wavelength laser). The signal light may be a continuous wave (CW) light of a single or narrow wavelength. Further, the signal light may be chosen to be suitable for transmission (i.e., may be used as the sensing signal) for the chosen secondary intrusion monitoring system.

The monitoring fiber 30 receives the transmitted signal light via the first end of the monitoring fiber and reflects a portion of the signal light via the at least one detector 20 to the closure monitor. Further, the monitoring fiber 30 transmits a non-reflected portion of the signal light via the second end of the monitoring fiber. As mentioned above, the at least one detector may be, for example, a Fiber Bragg Grating (FBG) reflector.

The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber 30 and the at least one detector 20.

The signal generator of the closure monitor generates and transmits the signal light to the monitoring fiber 30 and a portion of the signal light is returned to the intrusion monitor by being looped back on the monitoring fiber 30. Accordingly, the system as shown in FIG. 1 may provide intrinsic monitoring of the closure and detector 20 via signal light and a single monitoring fiber 30.

Figure 2:
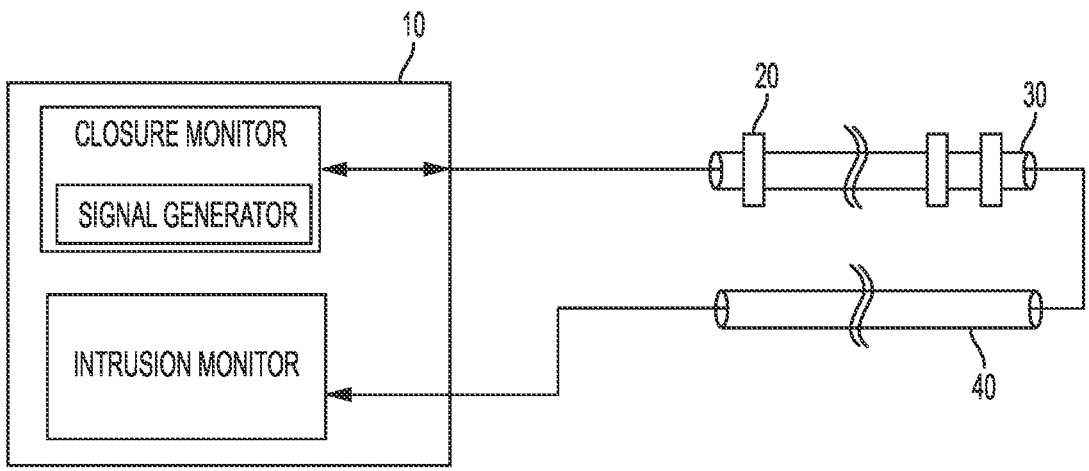
FIG. 2 illustrates the signal light being transmitted to the monitoring fiber 30 and a portion of the signal light being returned by an extrinsic sensor fiber 40.

As shown in FIG. 2, in another embodiment the system further comprises at least one sensor fiber 40 having a first end and a second end. The at least one sensor fiber 40 receives the transmitted non-reflected portion of the signal light via the first end of the at least one sensor fiber and transmits the non-reflected portion of the signal light via the second end of the at least one sensor fiber. The at least one sensor fiber 40 is a separate extrinsic sensor fiber and may be located, for example, proximate and along a sensor cable.

The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber 30 and the at least one detector 20.

The signal generator of the closure monitor generates and transmits the signal light to the monitoring fiber 30 and a portion of the signal light is returned to the intrusion monitor by being looped back on the at least one sensor fiber 40. Accordingly, the system as shown in FIG. 2 may provide extrinsic monitoring via signal light, a single monitoring fiber 30 and at least one sensor fiber 40.

Figure 3:
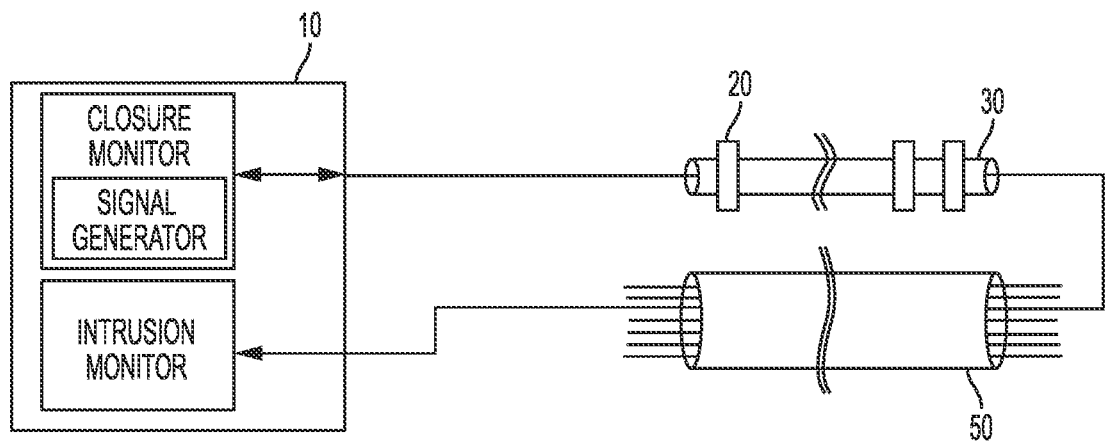
FIG. 3 illustrates the signal light being transmitted to the monitoring fiber 30 and a portion of the signal light being returned by at least one unused fiber of a cable 50.

As shown in FIG. 3, in another exemplary embodiment, the system may further comprise at least one unused fiber (i.e. a dark fiber) having a first end and a second end. The at least one unused fiber does not actively transmit or carry data. The at least one unused fiber receives the transmitted non-reflected portion of the signal light via the first end of the at least one unused fiber and transmits the non-reflected portion of the signal light via the second end of the at least one unused fiber.

The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber 30 and the at least one detector 20.

The signal generator of the closure monitor generates and transmits the signal light to the monitoring fiber 30 and a portion of the signal light is returned to the intrusion monitor by being looped back on the at least one unused fiber. Accordingly, the system as shown in FIG. 3 may provide intrinsic monitoring of the data cable via signal light, a single monitoring fiber 30 and at least one unused fiber.

As shown in FIG. 3, in another embodiment, the system further comprises at least one unused fiber having a first end and a second end. The at least one unused fiber does not transmit data. The at least one unused fiber receives the transmitted non-reflected portion of the signal light via the first end of the at least one unused fiber and transmits the non-reflected portion of the signal light via the second end of the at least one unused fiber. The at least one unused fiber is a fiber among a plurality of fibers of a cable 50.

The intrusion monitor receives the transmitted non-reflected portion of the signal light, and monitors the non-reflected portion of the signal light to detect transient changes in the non-reflected portion of the signal light indicative of at least one of a vibration, a motion and a handling of at least one of the monitoring fiber 30 and the at least one detector 20.

Therefore the signal generator of the closure monitor generates and transmits the signal light to the monitoring fiber 30 and a portion of the signal light is returned to the intrusion monitor by being looped back on the at least one unused fiber. Accordingly, the system as shown in FIG. 3 may provide intrinsic monitoring via signal light, a single monitoring fiber 30 and at least one unused fiber.

Figure 4:
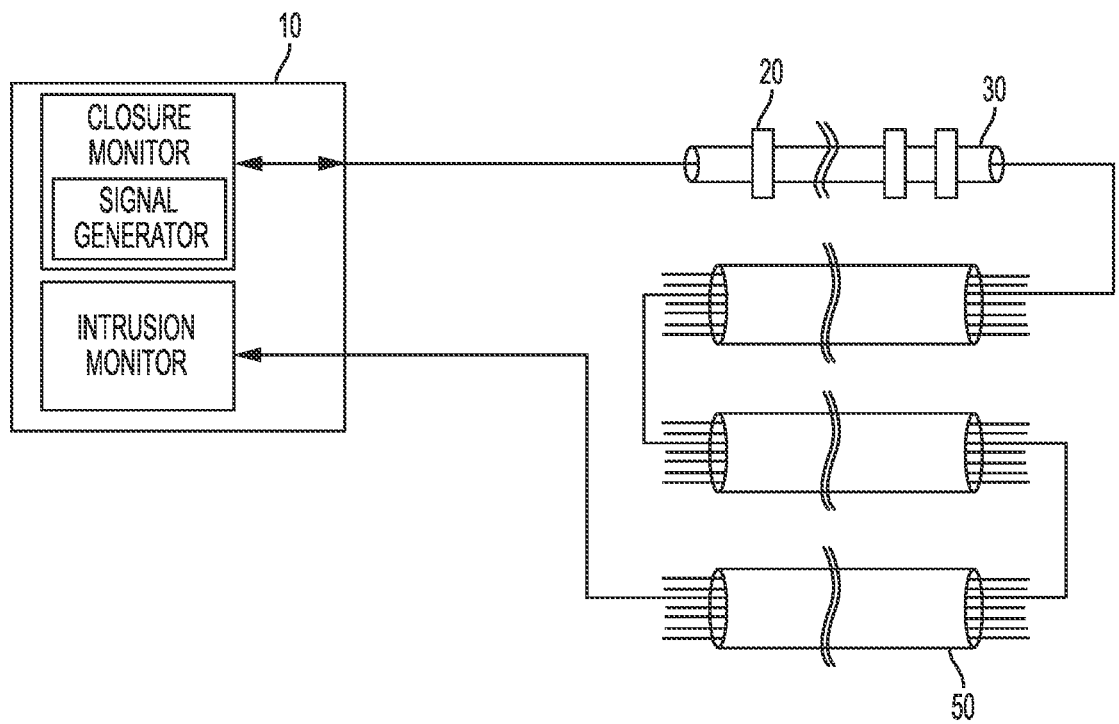
FIG. 4 illustrates the signal light being transmitted to the monitoring fiber 30 and a portion of the signal light being returned by at least one unused fiber of a plurality of cables 50.

As shown in FIG. 4, in another embodiment the system further comprises an unused fiber among a plurality of fibers of a plurality of cables 50 respectively having a first end and a second end. The unused fiber does not transmit or carry data. The unused fiber receives the transmitted non-reflected portion of the signal light via the first end of the unused fiber and transmits the non-reflected portion of the signal light via the second end of the unused fiber. The plurality of fibers are fibers of respective data cables 50.

Therefore, and as shown in FIG. 4, the signal generator of the closure monitor may be configured to generate and transmits the signal light to the monitoring fiber 30 and a portion of the signal light is directed to the instrusion monitor by being looped back on the unused fiber. Accordingly, the system as shown in FIG. 4 may provide intrinsic monitoring via signal light transmitted through a single monitoring fiber 30 and the unused fiber back to the intrusion monitor.

As shown in FIG. 5, according to another exemplary embodiment, the system further may include the least one sensor fiber 40 and a plurality of unused fibers. However, the system may also comprise the at least one sensor fiber 40 and a single unused fiber.

As shown in FIG. 5, the signal generator of the closure monitor generates and transmits the signal light to the monitoring fiber and a portion of the signal light is returned to the intrusion monitor by being looped back on the at least one sensor fiber and an unused fiber among the plurality of fibers. Accordingly, the system as shown in FIG. 5 may provide extrinsic monitoring via the at least one sensor fiber 40 and intrinsic monitoring via the unused fiber among the plurality of fibers.

Figure 6:
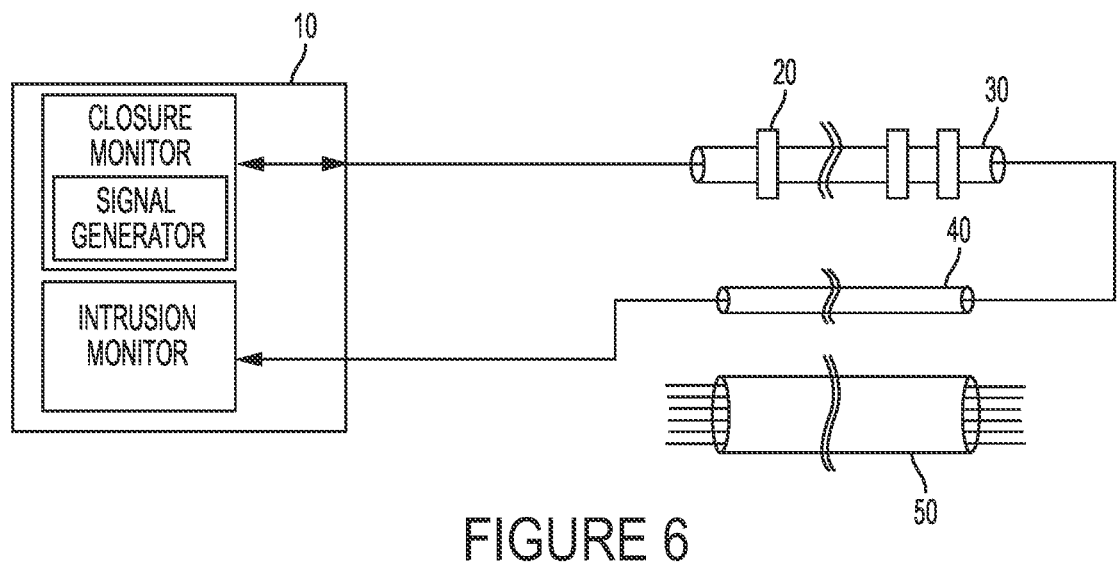
FIG. 6 illustrates the signal light being transmitted to the monitoring fiber 30 and a portion of the signal light being returned extrinsically by the at least one sensor fiber 40 that monitors at least one unused fiber of a cable 50 located proximate and along the at least one sensor fiber 40.

As shown in FIG. 6, in another exemplary embodiment the system further comprises the at least one sensor fiber 40 located proximate and along a cable 50.

As shown in FIG. 6, the signal generator of the closure monitor generates and transmits the signal light to the monitoring fiber 30 and a portion of the signal light is returned to the intrusion monitor by being looped back on the at least one sensor fiber 40. Accordingly, the system as shown in FIG. 6 may provide extrinsic monitoring via the at least one sensor fiber 40 that monitors the at least one unused fiber of the data cable 50 thereby alarming the conveyance and protecting the data cable 50.

According to another exemplary embodiment, the signal light transmitted by the signal generator of the closure monitor may be a light source that is configured to generate light signals that are unsuitable for the intrusion monitor. Therefore, the intrusion monitor must supply an optical source or signal light that is separate from but generally compatible with the signal being generated by the closure monitor. The signal light provided by the intrusion monitor may be used to intrinsically or extrinsically to monitor for intrusions of a data cable 50 and, also, intrinsically and extrinsically monitor the monitoring fiber 30 and detectors 20.

Figure 7:
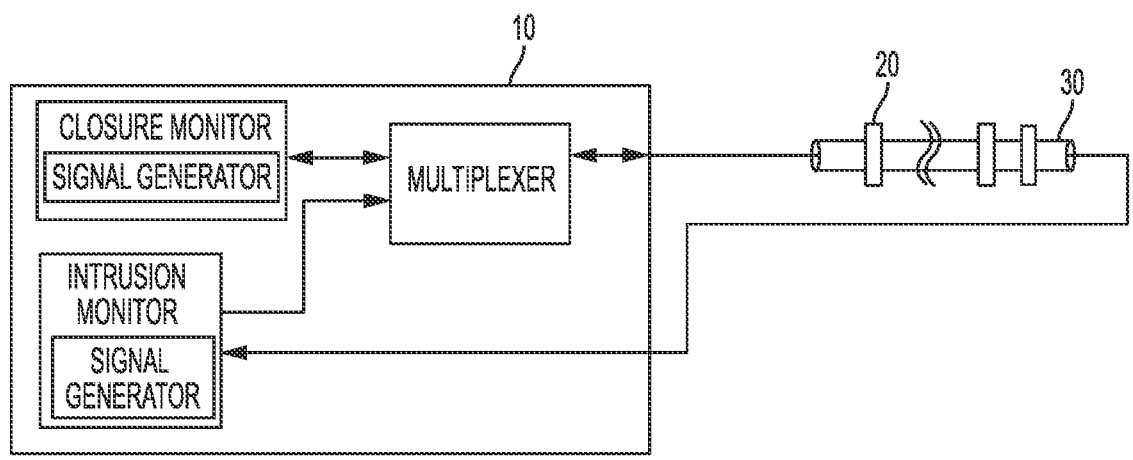
FIG. 7 illustrates signals from two light transmitters being multiplexed and being transmitted to the monitoring fiber 30.

As shown in FIG. 7 and according to the second embodiment, a system for detecting an intrusion of at least one of a monitoring fiber 30 and/or a detector 20 comprises a sensor having a closure monitor and an intrusion monitor, a multiplexer, a monitoring fiber having a first end and a second end and at least one detector 20 attached to the monitoring fiber 30.

The closure monitor includes a first signal generator that generates and transmits a first signal light. The first signal generator may be one of multiple continuous wave (CW) light sources such as the spectrum of wavelengths consistent with dense wavelength division multiplexing (DWDM) and an optical time domain reflectometer (OTDR). The first signal light may be a pulsed signal light.

The intrusion monitor includes a second signal generator that generates and transmits a second signal light. The second signal generator may be one a laser, a light emitting diode or other broadband light source and a variable wavelength source (e.g., a swept wavelength laser). The second signal light is continuous wave (CW) light of a single or narrow wavelength.

The multiplexer multiplexes the first signal light and the second signal light. The multiplexer may be one of a dense wavelength division multiplexer (DWDM); a filter wavelength division multiplexer (WDM); a thin film WDM; a coarse wavelength division multiplexer (CWDM); an add/drop multiplexer, a polarization controller; and a time division multiplexer (TDM).

The monitoring fiber 30 receives the transmitted multiplexed signal light via the first end of the monitoring fiber and reflects a portion of the multiplexed signal light via the at least one detector 20 to the closure monitor. Further, the monitoring fiber transmits a non-reflected portion of the multiplexed signal light via the second end of the monitoring fiber. The at least one detector 20 may be a Fiber Bragg Grating (FBG) reflector.

The intrusion monitor receives the transmitted non-reflected portion of the multiplexed signal light, and monitors the non-reflected portion of the multiplexed signal light to detect transient changes in the non-reflected portion of the signal light indicative of at least one of a vibration, a motion and a handling of at least one of the monitoring fiber 30 and the at least one detector 20.

Therefore, the second signal generator of the intrusion monitor generates and transmits the second signal light (multiplexed the first signal light) to the monitoring fiber 30 and the second signal light is returned to the intrusion monitor by being looped back on the monitoring fiber 30. Accordingly, the system as shown in FIG. 7 may provide intrinsic monitoring using the intrusion monitor.

The system may provide intrinsic monitoring at the closure monitor because the first signal light has specific wavelengths tuned to multiple end FBG reflectors including those used for a door and/or manhole lift to determine a location of the door and/or manhole.

The system may also provide intrinsic monitoring for the monitoring fiber 30 with a single fiber alarm system that may include an optical time domain reflectometer (OTDR) or polarization optical time domain reflectometer (POTDR) wavelength specific or broadband reflection at the far end. The system may also intrinsically monitor the monitoring fiber 30 (using the intrusion monitor) by selecting a wavelength for the first signal light not used and not blocked by an FBG.

Figure 8:
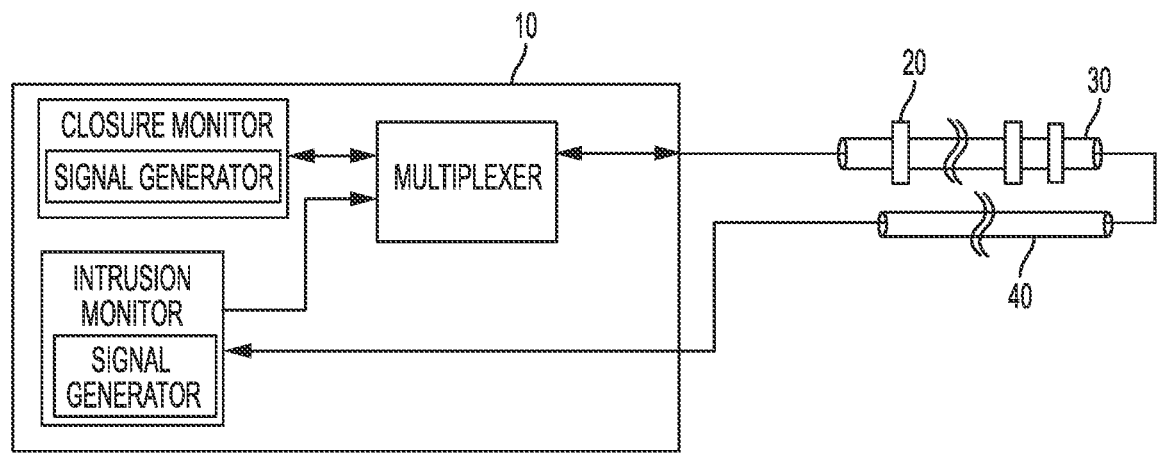
FIG. 8 illustrates signals from two light transmitters being multiplexed, the multiplexed signals being transmitted to the monitoring fiber 30 and a portion of the multiplexed signal light being returned extrinsically by the at least one sensor fiber 40.

As shown in FIG. 8, in another exemplary embodiment, the system further comprises at least one sensor fiber 40 having a first end and a second end. The at least one sensor fiber 40 receives the transmitted non-reflected portion of the multiplexed signal light via the first end of the at least one sensor fiber 40 and transmits the non-reflected portion of the multiplexed signal light via the second end of the at least one sensor fiber. The at least one sensor fiber 40 is a separate extrinsic sensor fiber that may be located proximate and along a sensor cable.

The intrusion monitor receives the transmitted non-reflected portion of the multiplexed signal light, and monitors the non-reflected portion of the multiplexed signal light to detect transient changes in the non-reflected portion of the signal light indicative of at least one of a vibration, a motion and a handling of at least one of the monitoring fiber 30 and the at least one detector 20.

The first signal light and the second signal light is multiplexed and transmitted to the monitoring fiber and a portion of the multiplexed signal light is returned to the intrusion monitor by being looped back on the at least one sensor fiber 40. Accordingly, the system as shown in FIG. 8 may provide extrinsic monitoring of the data or sensor cable.

Figure 9:
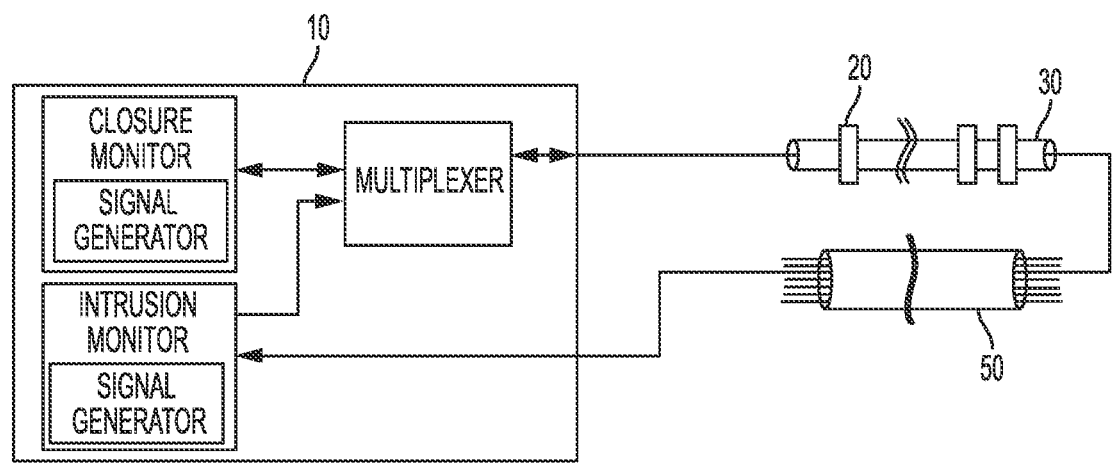
FIG. 9 illustrates signals from two light transmitters being multiplexed, the multiplexed signals being transmitted to the monitoring fiber 30 and a portion of the multiplexed signal being returned intrinsically on an unused fiber within a cable 50 containing a plurality of fibers.

As shown in FIG. 9, in another embodiment the system further comprises at least one unused fiber (i.e. a dark fiber) among a plurality of fibers of a cable 50. The unused fiber has a first end and a second end. The at least one unused fiber does not actively transmit data. The at least one unused fiber receives the transmitted non-reflected portion of the multiplexed signal light via the first end of the at least one unused fiber and transmits the non-reflected portion of the multiplexed signal light via the second end of the at least one unused fiber.

The intrusion monitor receives the transmitted non-reflected portion of the multiplexed signal light, and monitors the non-reflected portion of the multiplexed signal light to detect transient changes in the non-reflected portion of the signal light indicative of at least one of a vibration, a motion and a handling of at least one of the monitoring fiber 30 and the at least one detector 20.

Therefore, the first signal light and the second signal light are multiplexed and transmitted to the monitoring fiber 30 and a portion of the multiplexed signal light is returned to the intrusion monitor by being looped back on the at least one unused fiber. Accordingly, the system as shown in FIG. 9 may provide intrinsic monitoring of the cable containing the dark fiber.

Figure 10:
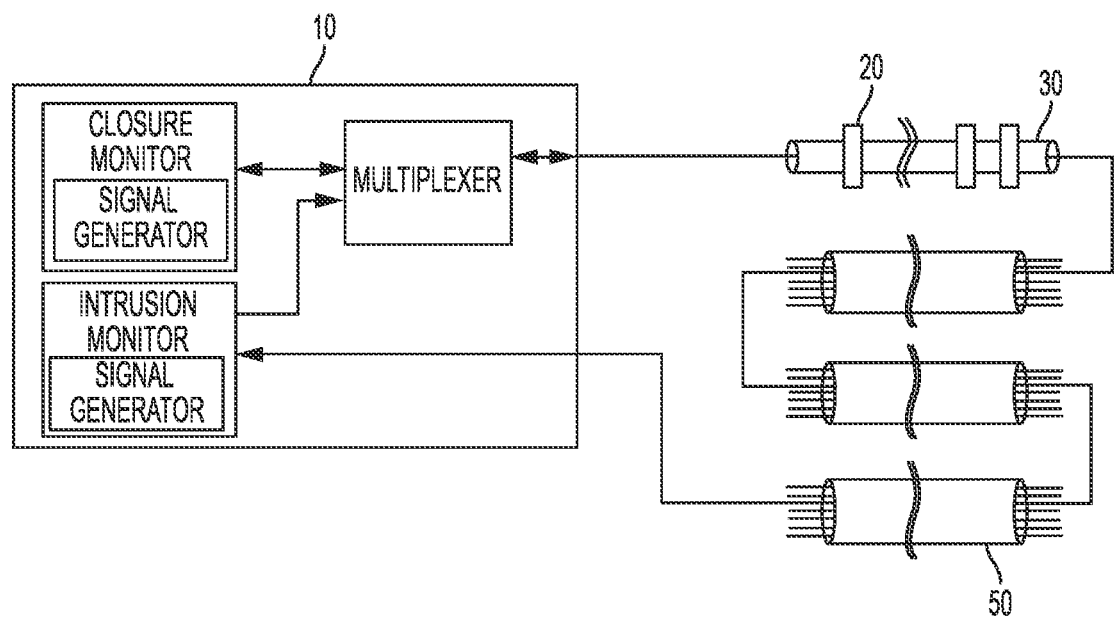
FIG. 10 illustrates signals from two light transmitters being multiplexed, the multiplexed signals being transmitted to the monitoring fiber 30 and a portion of the multiplexed signal being returned intrinsically on an unused fiber of a plurality of cables 50.

As shown in FIG. 10, in another embodiment, the system further may include a plurality of unused fibers respectively each having a first end and a second end. The plurality of unused fibers do not respectively transmit data. The plurality of unused fibers receive the transmitted non-reflected portion of the multiplexed signal light via the respective first ends of the plurality of unused fibers and transmit the non-reflected portion of the multiplexed signal light via the respective second ends of the plurality of unused fibers. The plurality of unused fibers are fibers of respective data cables 50.

The first signal light and the second signal light are multiplexed and transmitted to the monitoring fiber 30 and a portion of the multiplexed signal light is returned to the intrusion monitor by being looped back on the plurality of unused fibers. Accordingly, the system as shown in FIG. 10 may provide intrinsic monitoring of multiple cables 50 via the unused fibers contained in the cables 50.

Figure 11:
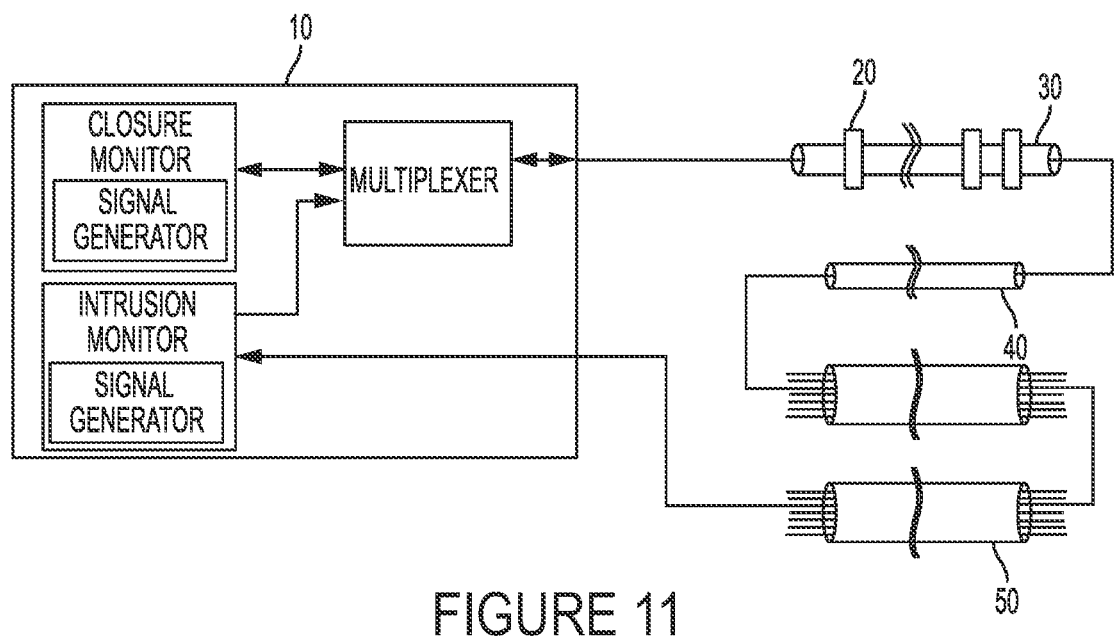
FIG. 11 signals from two light transmitters being multiplexed, the multiplexed signals being transmitted to the monitoring fiber 30 and a portion of the multiplexed signal being returned intrinsically by an unused fiber of a plurality of cables 50 and extrinsically by a sensor fiber 40.

As shown in FIG. 11, in another embodiment the system further comprises the least one sensor fiber 40 and a plurality of unused fibers. However, the system may also comprise the at least one sensor fiber 40 and a single unused fiber.

As shown in FIG. 11, the first signal light and the second signal light are multiplexed and transmitted to the monitoring fiber and a portion of the multiplexed signal light is returned to the intrusion monitor by being looped back on the at least one sensor fiber 40 and the plurality of unused fibers. Accordingly, the system as shown in FIG. 11 may provide extrinsic monitoring of the monitoring and sensor fibers 40 and intrinsic monitoring of the cables 50 carrying unused fibers.

As shown in FIG. 12, a system for detecting an intrusion of at least one of a monitoring fiber 30 and a detector 20 includes a closure monitor and an intrusion monitor. The monitoring fiber 30 has a first end and a second end and at least one detector 20 is attached to the monitoring fiber 30. The system may also include a data device, a multiplexer, and a demultiplexer. The closure monitor includes a first signal generator and the second data device includes a second signal generator.

The first signal generator of the closure monitor generates and transmits a first signal light having, for example, a first wavelength. The monitoring fiber 30 receives the transmitted first signal light via the first end of the monitoring fiber and reflects a portion of the first signal light via the at least one detector 20 back to the closure monitor. Further, the monitoring fiber 30 transmits a non-reflected portion of the first signal light via the second end of the monitoring fiber.

The signal generator of the data device generates and transmits second signal light having a second wavelength. As shown in FIG. 12, there may be two or more data devices exchanging data along the bi-directional active fiber. The multiplexer multiplexes the non-reflected portion of the first signal light and the second data carrying signal light. The bi-directional active fiber receives the transmitted multiplexed signal light via the first end of the active fiber and transmits the multiplexed signal light via the second end of the active fiber.

The demultiplexer separates the non-reflected portion of the first signal light having a first wavelength and the second signal light having a second wavelength. Accordingly, the intrusion monitor receives the transmitted non-reflected portion of the first signal light. In addition, the intrusion monitor monitors the non-reflected portion of the first signal light to detect transient changes in the non-reflected portion of the multiplexed signal light indicative of at least one of a vibration, a motion and a handling of at least one of the monitoring fiber 30 and the at least one detector 20. The intrusion monitor may also provide for intrinsic monitoring of the cable carrying the active fiber.

As shown in FIG. 13, a system for detecting an intrusion of at least one of a monitoring fiber 30 and a detector 20 comprises a closure monitor; an intrusion monitor and a first multiplexer. The monitoring fiber has a first end and a second end and at least one detector 20 is attached to the monitoring fiber 30. The system may also include a second multiplexer and one or more devices communicating along one or move active fibers. The active fiber has a first end and a second end and actively transmits data between the data devices. The system also includes a demultiplexer. The closure monitor includes a first signal generator, the intrusion monitor includes a second signal generator, and the data device includes a third signal generator.

The first signal generator of the closure monitor generates and transmits first signal light having a first wavelength. The second signal generator of the intrusion monitor generates and transmits second signal light having a second wavelength. Subsequently, the multiplexer generates a first multiplexed signal light by multiplexing the first signal light having the first wavelength and the second signal light having the second wavelength.

The monitoring fiber 30 receives the transmitted first multiplexed signal light via the first end of the monitoring fiber and reflects a portion of the first multiplexed signal light via the at least one detector 20 to the closure monitor. Further, the monitoring fiber 30 transmits a non-reflected portion of the first multiplexed signal light via the second end of the monitoring fiber.

The third signal generator of the data device generates and transmits third signal light having a third wavelength. The second multiplexer is configured to multiplex the non-reflected portion of the first multiplexed signal and the third signal light having the third wavelength. The data carrying third light signal is separated (or combined) from the light signal used by the intrusion monitor at each of the two or more data devices (see FIG. 13).

The active fiber carries the second signal light, which passed through the detectors 20 and was multiplexed with the data signal. The second signal light returns to the intrusion monitor.

The intrusion monitor receives the second signal light having the second wavelength as the non-reflected portion of the first multiplexed signal light. Further, the intrusion monitor monitors the non-reflected portion of the first multiplexed signal light to detect transient changes in the non-reflected portion of the first multiplexed signal light indicative of at least one of a vibration, a motion and a handling of at least one of the monitoring fiber 30 and the at least one detector 20. The intrusion monitor may also provide for intrinsic monitoring of the cable 50 carrying the active fiber.

What is claimed:

1. A system for detecting an intrusion of at least one of a monitoring fiber and a detector comprising:
    a closure monitor and an intrusion monitor,
    a first signal generator and a second signal generator;
    a multiplexer;
    at least one detector attached to the monitoring fiber, wherein the at least one detector reflects a first signal light, and
    wherein
        the first signal generator generated and transmits the first signal light,
        the second signal generator generates and transmits a second signal light,
        the multiplexer multiplexes the first signal light and the second signal light,
        the monitoring fiber
            receives the transmitted multiplexed signal light carries the reflected first signal light from the at least one detector to the closure monitor, and
            carries the second signal light to the intrusion monitor, and
        the intrusion monitor
            receives the transmitted second signal light, and
            monitors the transmitted second signal light to detect transient changes in the second signal light indicative of at least one of a vibration, a motion and a handling of at least one of the monitoring fiber and the at least one detector.

2. The system of claim 1, wherein the first signal generator comprises one of a laser, a light emitting diode, a broadband light source and a variable wavelength source.

3. The system of claim 1, wherein the first signal generator is configured to generate a continuous wave (CW).

4. The system of claim 1, wherein the at least one detector comprises a Fiber Bragg Grating (FBG) reflector.

5. The system of claim 1, wherein the multiplexer is one of a dense wavelength division multiplexer (DWDM); a filter wavelength division multiplexer (WDM); a thin film WDM; a coarse wavelength division multiplexer (CWDM); an add/drop multiplexer, a polarization controller; and a time division multiplexer (TDM).

6. A system for detecting an intrusion of at least one of a monitoring fiber and a detector comprising:
    a closure monitor,
    a first signal generator;
    an intrusion monitor;
    the monitoring fiber having a first end and a second end;
    at least one detector attached to the monitoring fiber; wherein the at least one detector reflects a first signal light, and
    a data device,
    a second signal generator;
    a multiplexer;
    at least one active fiber actively carrying data; and
    a demultiplexer,
    wherein
        the first signal generator generates and transmits the first signal light having a first wavelength,
        the monitoring fiber
            receives the transmitted first signal light via the first end of the monitoring fiber and carries the reflected portion of the first signal light from the at least one detector to the closure monitor, and
            carries a non-reflected portion of the first signal light via the second end of the monitoring fiber,
        the second signal generator of the data device generates and transmits a second signal light having a second wavelength,
        the multiplexer multiplexes the non-reflected portion of the first signal light and the second signal light,
        the active fiber
            receives the transmitted multiplexed signal light via the first end of the active fiber, and
            carries the multiplexed signal light to the second end of the active fiber to the demultiplexer, and
    wherein
        the demultiplexer separates the non-reflected portion of the first signal light having a first wavelength and the second signal light having a second wavelength, and
        the intrusion monitor
            receives the non-reflected portion of the first signal light from the demultiplexer, and
            monitors the non-reflected portion of the first signal light to detect transient changes in the non-reflected portion of the first light indicative of at least one of a vibration, a motion and a handling of at least one of the monitoring fiber and the at least one detector.

* * * * *